(12) United States Patent
Jahreiss et al.

(10) Patent No.: US 6,920,033 B2
(45) Date of Patent: Jul. 19, 2005

(54) VARIABLE CAPACITOR HAVING AN INCREASED CURRENT CAPACITY

(75) Inventors: Lothar Jahreiss, Zurich (CH); Bernhard Hug, Bumpliz (CH); Walter Bigler, Heitenried (CH); Michael Hamberger, Huttwill (CH)

(73) Assignee: Comet AG, Flamatt (CH)

( * ) Notice: Subject to any disclaimer, the term of this patent is extended or adjusted under 35 U.S.C. 154(b) by 0 days.

(21) Appl. No.: 10/491,542

(22) PCT Filed: Oct. 2, 2002

(86) PCT No.: PCT/CH02/00549

§ 371 (c)(1),
(2), (4) Date: Jun. 30, 2004

(87) PCT Pub. No.: WO03/028789

PCT Pub. Date: Apr. 10, 2003

(65) Prior Publication Data

US 2005/0052820 A1 Mar. 10, 2005

(Under 37 CFR 1.47)

(30) Foreign Application Priority Data

Oct. 3, 2001 (CH) .............................................. 1823/01

(51) Int. Cl.$^7$ ................................................ H01G 5/00
(52) U.S. Cl. ........................ 361/277; 361/278; 361/292
(58) Field of Search ................................ 361/277, 278, 361/287, 290, 292, 299.5, 298.2

(56) References Cited

U.S. PATENT DOCUMENTS 3,244,951 A * 4/1966 Wallace ...................... 361/293
4,068,285 A * 1/1978 Yamada et al. ............. 361/293

* cited by examiner

Primary Examiner—Anthony Dinkins
(74) Attorney, Agent, or Firm—Burns, Doane, Swecker & Mathis, LLP

(57) ABSTRACT

The invention relates to a variable capacitor which, due to its particular arrangement of electrodes, enables a significantly higher current flow than generally known constructions having the same or a similar structural shape, said capacitor also has an increased life expectancy and is compatible with existing capacitors in terms of connection. Such variable capacitors can be used in high frequency generators, in matchboxes and in interface networks for industrial high frequency applications, as regulatable filters in high frequency power electronics and in the power part of emission installations.

12 Claims, 4 Drawing Sheets

VARIABLE CAPACITOR HAVING AN INCREASED CURRENT CAPACITY

The invention relates to a variable capacitor with increased current carrying capacity according to Claim 1 and applications according to Claims 11 and 12.

Variable vacuum capacitors usually have a metallic spring bellow that, on the one hand, conducts the current from the electrode with which it is electrically connected to the external contact points and, on the other hand, represents a mechanically deformable dividing wall between the vacuum present around the electrodes and the external atmospheric pressure. To achieve a long lifespan, i.e. enable as many movement cycles as possible, the bellow material must be selected so that it has good mechanical properties. On the other hand, it must have good electrical conductivity in order to minimize electrical losses and to avoid unnecessary heating, which again may have a negative effect on mechanical long-term behavior. However, the necessary structure of the bellow folds also results in long current paths, leading to an increased electrical series resistance and increased series inductance.

U.S. Pat. No. 3,611,075 introduces a variable vacuum capacitor characterized by a low inherent resonance frequency and provided with a unilateral, electrical connection for coaxial lines. It is application-specific, i.e. determined by an application. It also comprises three insulator parts, which makes for a complex construction and is also a disadvantage.

It is the objective of the invention to describe a variable capacitor that, in comparison to previous versions and sizes, permits a marked increase in electric current carrying capacity combined with lifespan values several times higher than previously known. Another objective of the invention is to design the shape of the variable capacitor in such a way as to allow replacement of an existing version, so that an improvement of the performance characteristics of an existing application can be sustained in a simple manner.

According to the invention, this objective is realized with a variable capacitor according to the wording of Claim 1 and applications according to Claims 11 and 12.

The invention is described below with the help of drawings. In these drawings.

Figure 1:
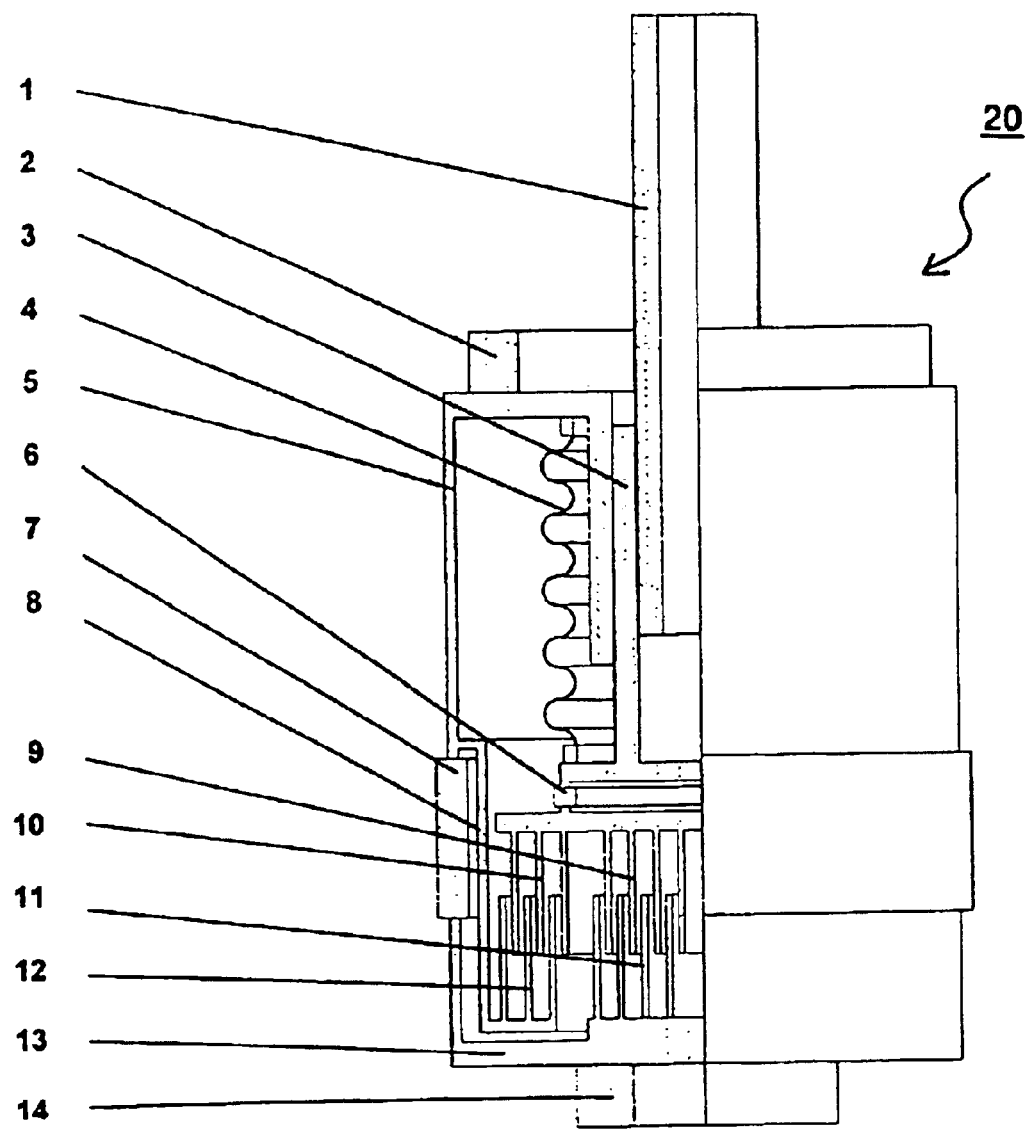
FIG. 1 shows a sectional view of a schematic illustration of a variable capacitor with increased current carrying capacity according to the invention.

A variable capacitor 20 with a housing bottom 13 and a connection 14 arranged on the outside of the latter in an electrically conductive manner has on the inside of the housing bottom 13 an inner electrode 11 connected with the latter in an electrically conductive manner, said inner electrode being part of a fixed electrode part. The housing bottom 13 transitions at its outer limit into a cylindrical housing, to which the lower side of an insulator ring 7 is attached in a gas-tight manner. On the top of the insulator ring 7 is located a cylindrical housing jacket 5, also attached in a gas-tight manner, that is terminated at its top end by a housing cover with a connection 2 attached to its outside in an electrically conductive manner. The housing cover has in its center an opening for an adjustment device 1 that guides a variable electrode part in a sliding manner by way of a guide device 3. The guide device 3 is connected by way of a spring bellow 4 with the inside of the housing cover. The space between the housing jacket 5 and the spring bellow 4 is used for evacuation or for filling with gas. The variable electrode part, consisting of an inner electrode 9 and an outer electrode 10 connected galvanically and mechanically with the former is connected via an insulator 6 with the adjustment device 1. The inner electrode 9 comprises a plurality of electrode elements or electrode plates arranged concentrically or helically around the center axis of the capacitor. By way of the adjustment device 1, they are able to dip into the electrodes of the fixed electrode part. The housing jacket 5 continues above its attachment at the insulator ring 7 on its inside in a conductive manner with an inner jacket ring 8, at the lower end of which an outer electrode 12 is attached, which is part of the fixed electrode part. In this way, the housing jacket 5 is mechanically and electrically connected with the outer electrode 12. The outer electrode 12 comprises a number of electrode elements or electrode plates that surround the center axis of the capacitor concentrically or helically, but which are arranged galvanically and mechanically separated from the inner electrode 11 of the fixed electrode part.

The electrode elements 9, 10, 11, 12 also may be constructed helically.

Because the outer electrode 12 of the fixed electrode part is fed via the upper connection 2, the housing jacket 5, and the inner jacket ring 8, the spring bellow 4 remains current-free, since the insulator 6 ensures the galvanic separation of the guide device 3 with spring bellow 4 from the variable electrode part with electrodes 9, 10.

By directing the electrical current lines on paths outside of the spring bellow 4, the spring bellow material can be optimized according to purely mechanical aspects. The electrical current then is able to flow on a metallic path that is even more advantageous for the high-frequency current. As a topological consequence of this, the electrode packets must be designed so that the adjusting element for the variable electrode part with electrodes 9, 10, including the spring bellow 4, remains current-free. This means that the spring bellow is not heated, which protects the material. This can be achieved in that the variable electrode part or the adjustable electrode assumes an electrical bridge function, said bridge, for the purpose of adjusting the capacity of the capacitor, being immersed more or less deeply into two additional, galvanically separated electrodes that are part of the fixed electrode part. The two last mentioned electrodes 11, 12 then may be connected via mechanically rigid, electrical connections with the connection points or connections of the capacitor. With the two connections 2, 14 of the capacitor, the latter can be constructed so that it is 100% able to replace generally known constructions of same or similar design. This is especially advantageous for refitting purposes.

The design of the electrodes is widely variable. For example, the electrode elements of the electrode 11 of the fixed electrode part may have different heights with respect to each other, resulting in novel capacity behaviors within the adjustment range, which are not described in detail here. It is, however, preferred that the electrode elements are of the same height.

One construction with electrode elements of different heights, as described for electrode 11, also applies to the other electrodes 9, 10, and 12 or parts thereof.

According to the invention, the increase in current load capacity is 20–30% with a simultaneous five-fold increase in lifespan; this means that up to 5 times as many cycles can be performed.

The described construction of such a variable capacitor applies preferably to vacuum capacitors, but is principally also valid for gas-filled capacitors.

Figure 2:
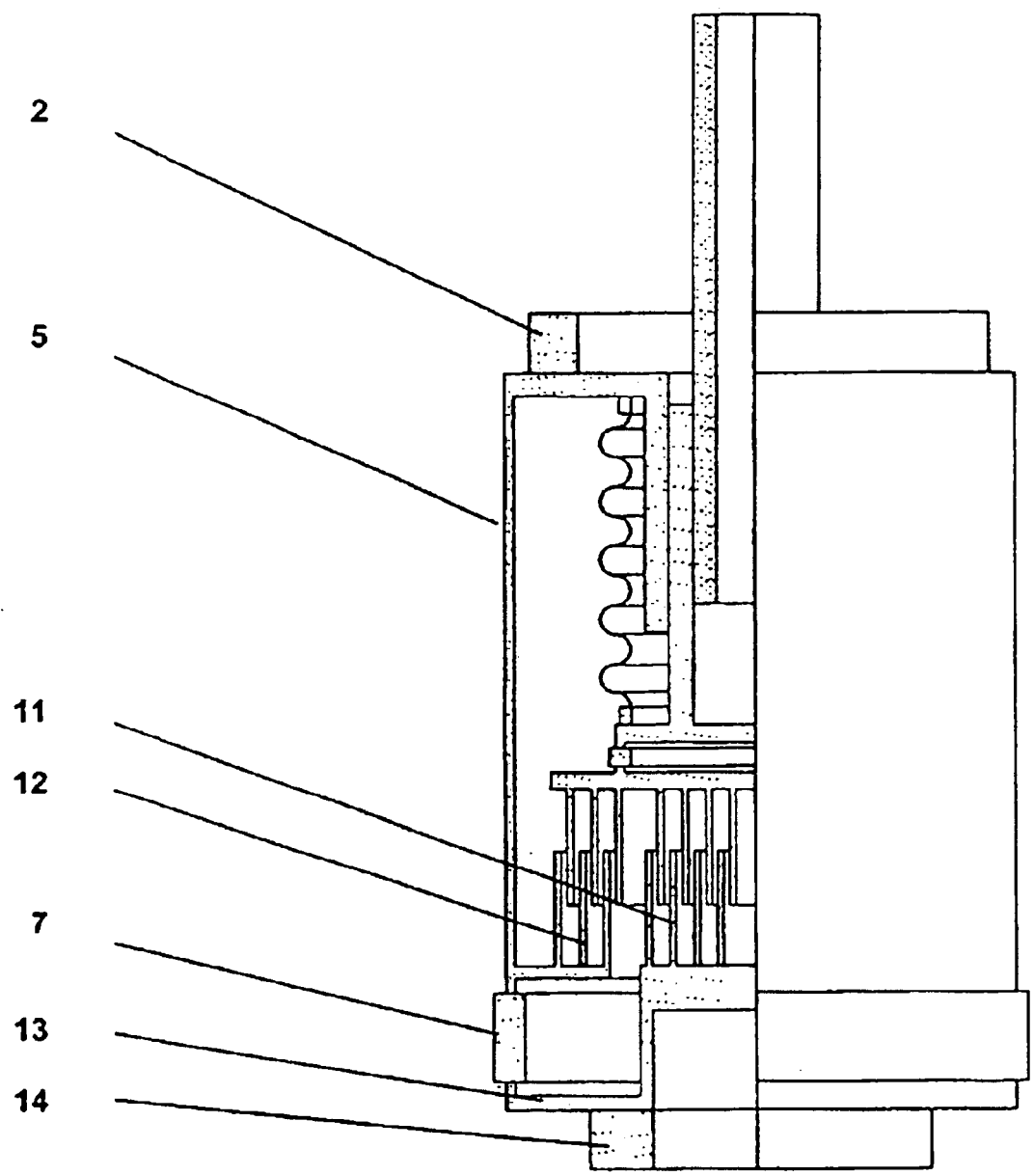
FIG. 2 shows a first embodiment of a connection-compatible, variable vacuum capacitor.

FIG. 2 shows a first embodiment of a connection-compatible, variable vacuum capacitor. The shown variable vacuum capacitor essentially corresponds to the construction of the capacitor according to FIG. 1 and has the following differences. The insulator ring 7 has a diameter of 90 mm and a cross-section of 20×7 mm with an overall capacitor height of 130 mm and is located at a small distance above the housing bottom 13. The housing jacket 5 is constructed longer, there is no inner jacket ring, and the outer electrode 12 of the fixed electrode part is attached just vertically above the insulator ring 7 of the housing jacket 5. The capacity is 500 pF, and the permissible voltage is 10 kVpt (peak test).

Connections 2 and 14 for electrodes 12 and 11 are produced in ring shape with outside diameters of 70 mm or 35 mm respectively, so that it therefore has a connection geometry like existing variable vacuum capacitors with an overall height of 130 mm and easily can replace them, i.e. is connection-compatible.

Figure 3:
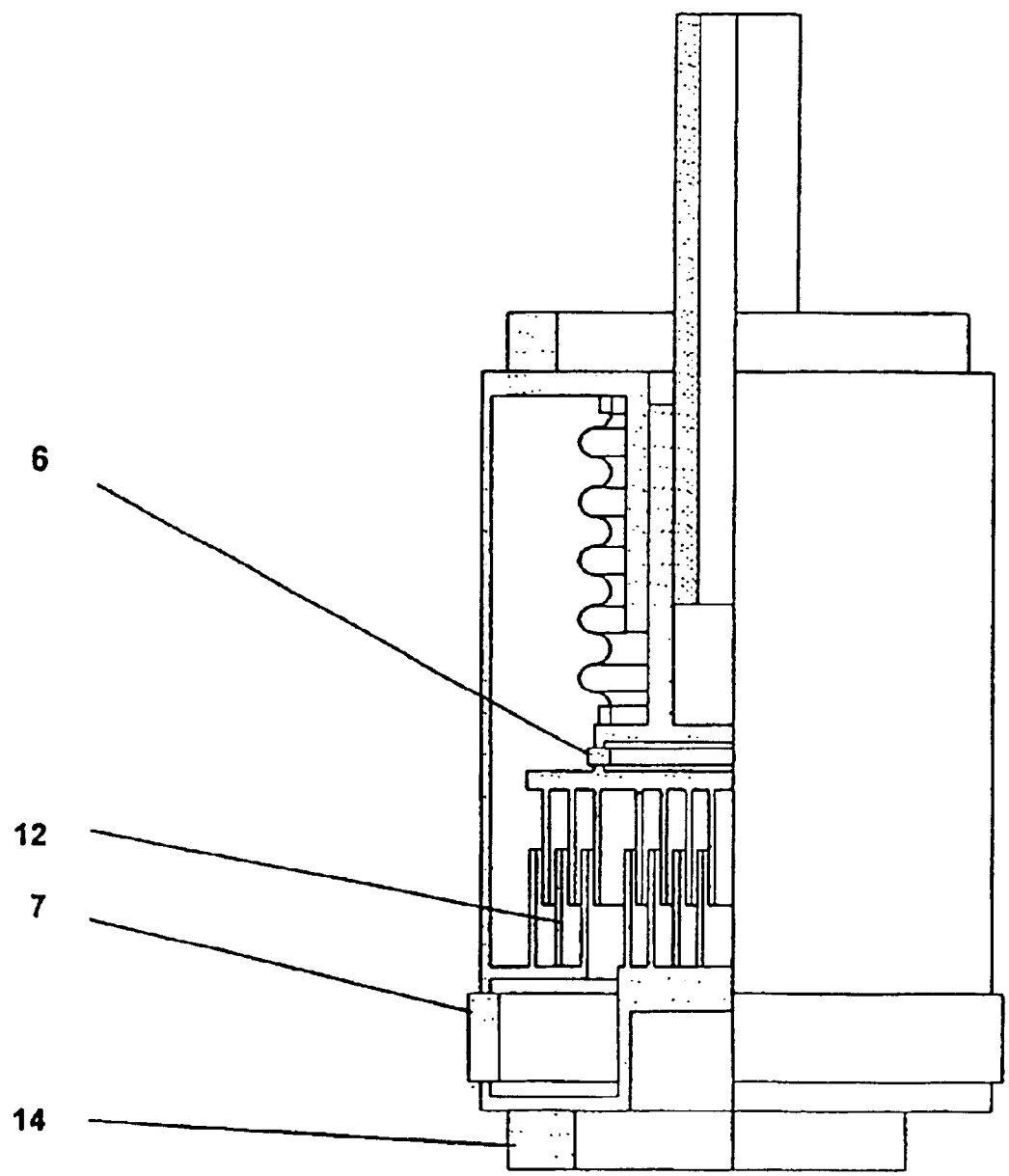
FIG. 3 shows a second embodiment of a variable vacuum capacitor with a small, lower connection ring.

FIG. 3 shows a second embodiment of a variable vacuum capacitor with a large lower connection ring.

The shown variable vacuum capacitor essentially corresponds to the construction of the capacitor according to FIG. 2. It has the following differences. The insulator ring 7 is a ceramic ring with dimensions of 80×15 mm. The insulator 6 is a ceramic ring with an outside diameter of 40 mm and a cross-section of 15×5 mm. Its overall height is 120 mm. The capacity is 800 pF, and the permissible voltage is 5 kVpt (peak test). The connection 14 for electrode 12 is produced in ring shape with an outside diameter of 70 mm, so that it therefore also fulfills the requirements of a connection geometry of existing vacuum capacitors with an overall height of 120 mm and is fully connection-compatible with them.

Figure 4:
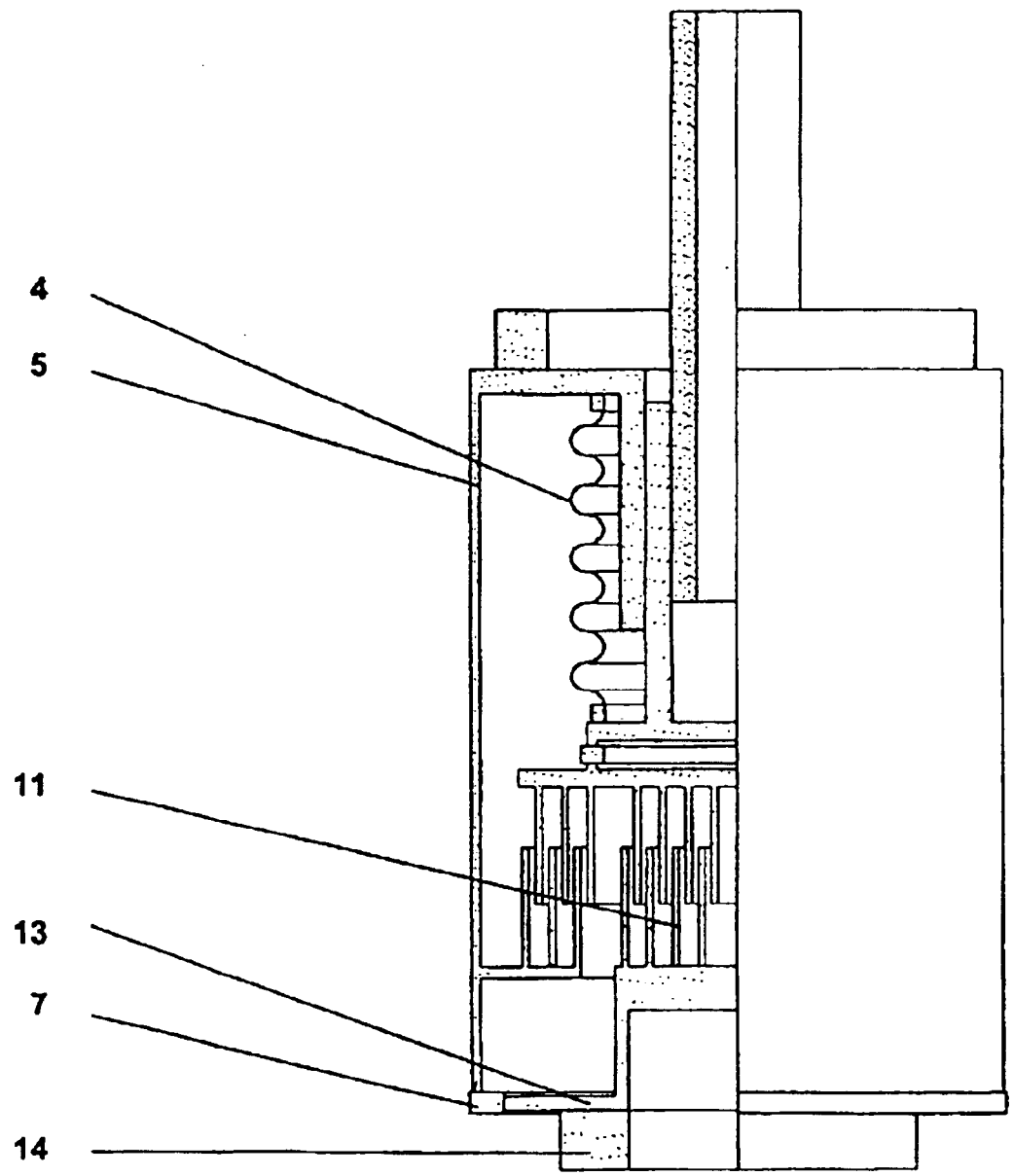
FIG. 4 shows a third embodiment of a gas-filled, variable capacitor with an insulator as part of the housing bottom.

FIG. 4 shows a third embodiment of a gas-filled, variable capacitor with an insulator as part of the housing bottom.

The shown, gas-filled variable capacitor essentially corresponds to the construction of the capacitor according to FIG. 2. It has the following differences. The insulator ring 7 is constructed in disk shape and is part of the housing bottom 13. It has an outside diameter of 80 mm and a cross-section of 5×15 mm. The capacitor has an overall height of 120 mm. The capacity is 1000 pF, and the permissible voltage is 5 kVpt (peak test). The connection 14 for electrode 11 is produced in ring shape with an outside diameter of 52 mm and has a cross-section of 1.5×13 mm. A standard gas filling is located in the space between the spring bellow 4 and the housing jacket 5.

The advantages of the variable capacitor according to the invention are its higher current load capacity along with a several times higher lifespan. Previous solutions involving compromises between electrical and mechanical requirements are no longer necessary. In addition, it may be produced with identical construction, i.e. an identical or at least very similar housing appears to be beneficial, enabling a simple upgrade with respect to higher HF current, higher HF power, and longer lifespan of an already existing equipment construction.

New constructions in which such a capacitor is used can be designed for higher HF currents and powers without requiring greater dimensions themselves.

Smaller electrical path resistance values result in reduced electrical power losses, which result in a higher total efficiency. Shorter electrical current paths also result in reduced serial inductivity, which expands the application range for vacuum capacitors far into the VSW range (>150 MHz).

It is found to be particularly advantageous that the spring bellow is kept current-free with only one second insulator at the variable electrode part.

Such capacitors are used in high-frequency generators and matchboxes and matching networks for industrial HF applications, as adjustable filters in HF power electronics, and in the power unit of transmitting stations.

It is essential for the invention that the capacitor according to the invention, due to its special arrangement of the electrodes, permits a distinctly higher current flow than generally known constructions, that it is simultaneously characterized by an increased lifespan, and that it is connection-compatible.

What is claimed is:

1. Variable capacitor, comprising a fixed electrode part and a variable electrode part, a housing bottom, an insulator ring, a housing jacket, a spring bellow, and an adjustment device, wherein the fixed electrode part consists of an inner electrode and an outer electrode galvanically separated from the former; wherein the variable electrode part consists of an inner electrode and an outer electrode connected galvanically with the former; wherein the variable electrode part is connected via an insulator with the adjustment device, and the latter is connected by way of the spring bellow in a gas-tight manner with the housing jacket; wherein the housing jacket is separated from the housing bottom by an insulator ring; and wherein the inner and outer electrodes of the variable electrode part are arranged so as to be able to slide by means of the adjustment device via a guide device and able to dip into the inner and outer electrodes of the fixed electrode part, whereby the spring bellow is current-free.

2. Variable capacitor according to claim 1, wherein the outer electrode of the fixed electrode part is electrically connected with the housing jacket, whereby the latter has on the top a connection of the outer electrode through which one power supply is accomplished, while the inner electrode of the fixed electrode part has a lower connection through which the other power supply is accomplished.

3. Variable capacitor according to claim 1, wherein the outer electrode of the fixed electrode part is electrically connected with the housing jacket by way of an inner jacket ring.

4. Variable capacitor according to claim 1, wherein it has an externally identically constructed form with respect to existing variable capacitors and therefore can replace them or is connection-compatible with them.

5. Variable capacitor according to claim 1, wherein the electrode elements of the electrodes consist of concentrically arranged individual electrodes.

6. Variable capacitor according to claim 1, wherein the electrodes are arranged concentrically with respect to each other.

7. Variable capacitor according to claim 1, wherein the electrodes consist of helically arranged electrode elements or of individual electrodes.

8. Variable capacitor according to claim 7, wherein the electrodes are arranged concentrically with respect to each other.

9. Variable capacitor according to claim 1, wherein the outer electrodes (10, 12) have a different electrode height than the inner electrodes, but preferably have the same height.

10. Variable capacitor according to claim 1, wherein the electrode elements of the electrodes have a different electrode height with respect to each other, but preferably have the same height.

11. Use of the variable capacitor according to claim 1 in high-frequency generators and matchboxes and matching networks for industrial HF applications.

12. Use of the variable capacitor according to claim 1 in adjustable filters in HF power electronics and in the power unit of transmitting stations.

* * * * *